Nov. 22, 1966

H. L. DRYDEN
DEPUTY ADMINISTRATOR OF THE NATIONAL
AERONAUTICS AND SPACE ADMINISTRATION
ROLL ATTITUDE STAR SENSOR SYSTEM 3,286,953

Filed Aug. 17, 1964

INVENTOR
GERALD W. MEISENHOLDER
BY  9. McCoy

ATTORNEY

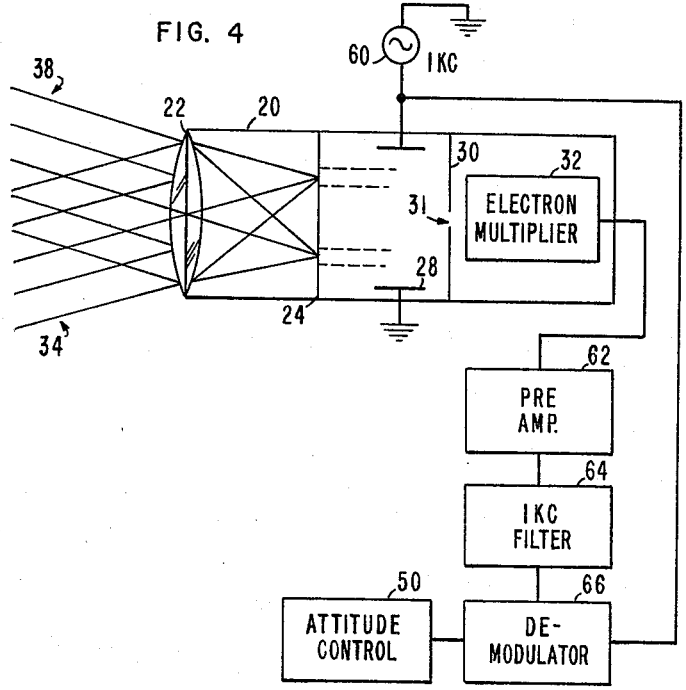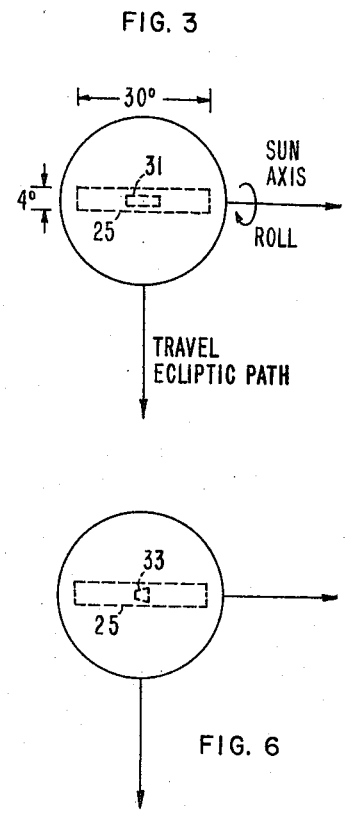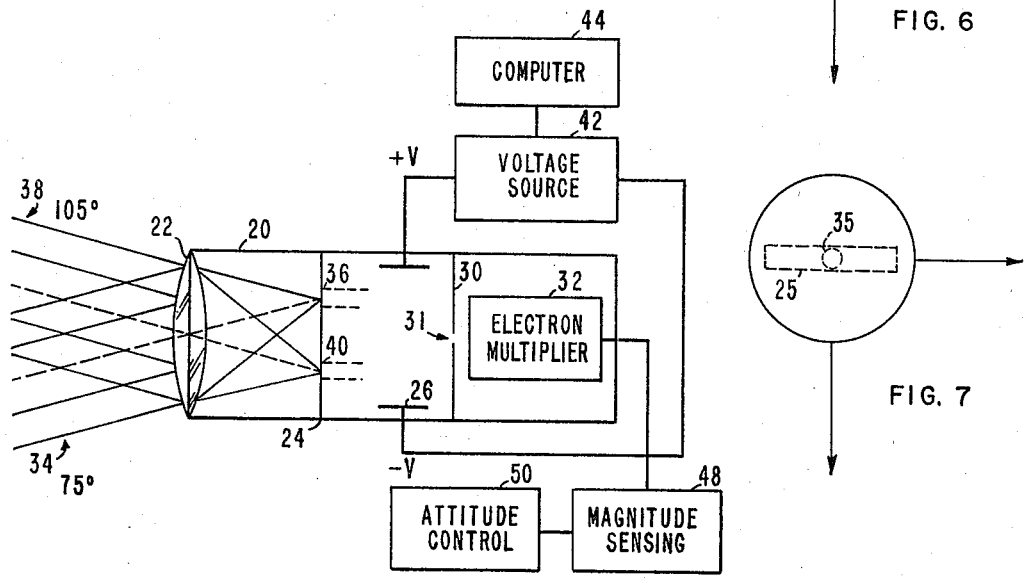
Nov. 22, 1966 — H. L. DRYDEN, DEPUTY ADMINISTRATOR OF THE NATIONAL AERONAUTICS AND SPACE ADMINISTRATION — 3,286,953
ROLL ATTITUDE STAR SENSOR SYSTEM
Filed Aug. 17, 1964
INVENTOR
GERALD W. MEISENHOLDER
ATTORNEY United States Patent Office 3,286,953
Patented Nov. 22, 1966

3,286,953
ROLL ATTITUDE STAR SENSOR SYSTEM
Hugh L. Dryden, Deputy Administrator of the National Aeronautics and Space Administration with respect to an invention of Gerald W. Meisenholder
Filed Aug. 17, 1964, Ser. No. 390,250
16 Claims. (Cl. 244—1)

This invention relates generally to space vehicles and more particularly to apparatus for use thereon for tracking a star in order to control the roll attitude of the vehicle.

A space vehicle may easily be oriented in pitch and yaw attitude by aligning a sensor on the vehicle with the sun. The roll attitude of the vehicle may be fixed by aligning a sensor with a star. It is desirable that the sun-vehicle-star angle be reasonably close to 90° at all times so that the vehicle roll attitude can be fixed accurately. Many space vehicles will be launched in the ecliptic planes. This makes it desirable to track a star that is positioned along a line through the sun and approximately perpendicular to the ecliptic plane. A star that is located close to this perpendicular and is brilliant enough to be easily acquired and tracked is the star Canopus.

Although Canopus probably represents the best star choice on which to track, it is actually positioned approximately 15° from a line through the sun and normal to the ecliptic plane. Thus, a Canopus tracker which nominally points 90° from the sun and normal to the ecliptic plane, must be able to acquire and track the star through a range of approximately 30°; i.e. 75° to 105° from the ecliptic plane. It is however usually not desirable to examine any more than a small segment (e.g. 5°) of this range at a time. In order do this, it is common practice to provide a star sensor including a gimballed mirror in combination with an optical system capable of viewing only the small segment. By modifying the orientation of the mirror as the vehicle proceeds in its orbital path, a consistent relationship between the star and the star sensor can be effectively maintained.

The use of a gimballed mirror and other moving mechanical parts necessary to selectively position the mirror is undesirable inasmuch as the environment to which the vehicle is subjected is often sufficient to cause a malfunction of these parts. In view of this, it is an object of the present invention to provide a star sensor which is able to track through a wide range, but which does not require the utilization of any moving mechanical parts.

It is an additional object of the present invention to provide a star sensor which can acquire and track a star even though the star image deviates from the optical axis of the sensor.

It is still an additional object of the present invention to provide means suitable for use in a space vehicle vehicle for controlling the roll attitude thereof.

Briefly, the present invention is directed to star sensor apparatus which is capable of examining different small sectors of a total field of view developing an electron beam consisting of portions whose positions are related to the positions of stars within the field of view. By selectively deflecting the beam in a first direction relative to a target, only those beam portions related to stars within a selected small sector are able to find the target. The amount of deflection can be varied as the vehicle changes its position in orbit to thus permit different small sectors to be examined. The roll angle of the vehicle can be ascertained by determining the amount of deflection required in a second direction for the beam positions to be brought into coincidence with said target.

A preferred sensor embodiment constructed in accordance with the present invention includes a wide angle optical system capable of imaging the full 30° field of view on a predetermined area of a photocathode. Spaced from the photocathode is a target plate having an aperture therein and positioned behind the aperture is an amplifying device such as an electron multiplier. Pairs of vertical and horizontal beam deflection plates are positioned between the photocathode and the apertured plate. By the appropriate application of first deflection signals to a first pair of deflection plates, only the electron beam portions derived from a selected portion of the photocathode will be allowed to pass through the apertured plate. Inasmuch as the magnitude of these deflection signals can be related to the orbital position of the vehicle, the effect of a gimballed mirror is achieved without the use of any moving mechanical parts.

By the appropriate application of second deflection signals to a second pair of plates, the electron beam can be caused to scan the apertured plate in a second direction. The second deflection signal magnitude required to deflect the electron beam through the aperture is a measure of the vehicle roll angle.

The novel features that are considered characteristic of this invention are set forth with particularity in the appended claims. The invention itself both as to its organization and method of operation, as well as additional objects and advantages thereof, will best be understood from the following description, when read in connection with the accompanying drawings, in which:

FIGURE 3 is a bottom diagrammatic view of a star sensor in accordance with the present invention;

FIGURE 4 is a diagrammatic side view of a star sensor in accordance with the present invention;

FIGURE 5 is a diagrammatic plan view of a star sensor in accordance with the present invention;

FIGURE 6 is a diagrammatic bottom view of an alternative embodiment of the present invention; and FIGURE 7 is a diagrammatic bottom view of still another embodiment of the present invention.

Figure 1:
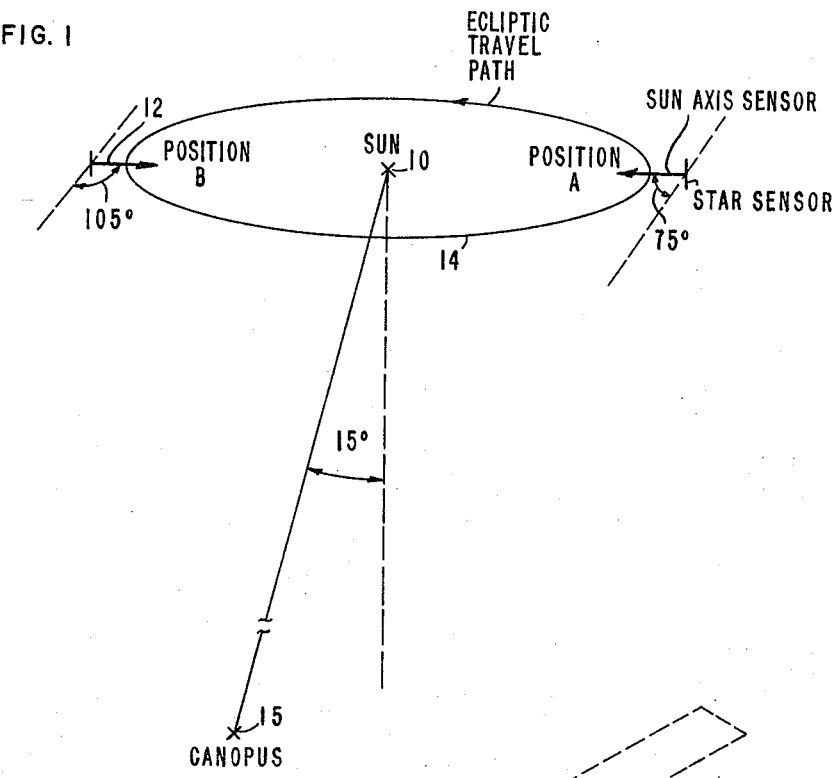
FIGURE 1 is a diagram schematically illustrating a space vehicle, and its relationship to the sun and star, which can advantageously employ a sensor in accordance with the present invention.
Figure 2:
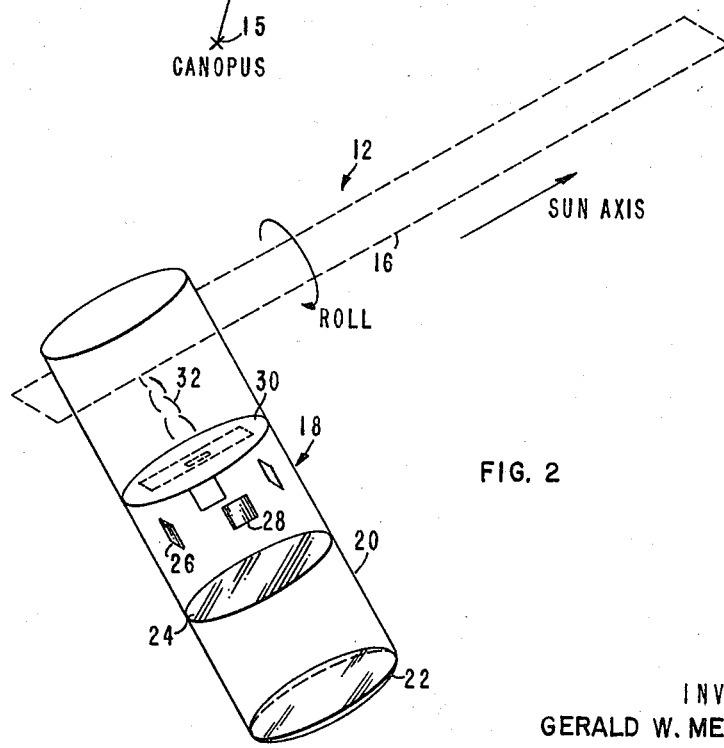
FIGURE 2 is a perspective diagram, partially broken away, illustrating a portion of a space vehicle and a star sensor, in accordance with the present invention, used therewith.

Attention is now called to FIGURE 1 which diagrammatically illustrates the relationship between the sun 10 and a space vehicle 12 orbiting around the sun in approximately an ecliptic plane 14. The space vehicle 12 can be provided with means, well known in the art, which sense the sun 10 and at all times direct a first axis of the vehicle toward the sun. Tracking on the sun permits the pitch and yaw attitude of the space vehicle to be precisely controlled. In order to control the roll attitude (i.e. rotational motion about said first axis) of the vehicle 12, it has been suggested that means be provided on the vehicle for tracking on a star. As should be apparent from FIGURE 1, it is preferable to track on a star which is positioned on a line which extends through the sun and is normal to the ecliptic plane. Inasmuch as there are no known stars which exactly satisfy these conditions and which are sufficiently bright for reliable acquisition and tracking, it has been suggested that the star Canopus 15 can be used advantageously. The star Canopus is positioned along a line which is approximately 15° from a line through the sun and perpendicular to the ecliptic plane. Because of the tremendously great distance between Canopus and the sun relative to the distance between the sun and an orbitive space vehicle, Canopus can be considered as being on a line which is 15° from a normal to any point in the ecliptic plane. Thus, Canopus will appear to be in the same position from either position A or position B of the vehicle orbital path. However, inasmuch as the space vehicle will effectively be oppositely oriented in positions A and B, Canopus would appear to be at a 75° angle from the ecliptic plane when the vehicle is in position A and at a 105° angle from the ecliptic plane when the vehicle is in position B. Accordingly, in order to track on Canopus, the star sensor carried by the vehicle 12 must have a total field of view extending from approximately 75° to 105° or in other words of (90±n)° where n equals approximately 15° depending on how much the vehicle's orbit deviates from the ecliptic plane.

Although it is necessary for the star sensor to be able to sense light, or more broadly electromagnetic energy, from many stars within this total field of view, it is desirable to examine no more than a small m° (e.g. 5°) sector at any one time. The position of the vehicle in its orbit will determine the particular sector to be examined. By limiting simultaneous examination to a small sector, the possibility of mistakenly tracking on stars other than Canopus, which may be nearly as bright as Canopus, is minimized. As was previously noted, prior star sensors employ an optical system which includes a gimballed mirror and other moving parts which modify the orientation of the mirror so as to collect energy from different sectors as the vehicle moves in its orbit. The orbital position of the vehicle can usually be ascertained through the utilization of various devices on the vehicle and on the basis of this ascertained position, the mirror is oriented to always cause the electromagnetic energy from Canopus to be collected. The environment to which the vehicle is subjected is often sufficient to damage the mechanism essential to properly orient the gimballed mirror as the vehicle moves in its path. In order to eliminate the necessity for employing moving mechanical parts, and in accordance with the present invention, a gimballing effect is achieved electronically rather than mechanically.

Attention is now called to FIGURES 2 through 5 which illustrate a preferred sensor embodiment in accordance with the present invention. The vehicle 12 includes sensor means (not shown) which always align a first vehicle axis 16 with the sun. Although tracking on the sun is sufficient to control the pitch and yaw attitude of the vehicle, it is not sufficient to control the roll attitude of the vehicle; that is, the turning of the vehicle around the axis 16. In order to control the roll attitude, a star sensor 18 is provided on the vehicle which is capable of tracking on Canopus.

The star sensor 18 preferably includes a cylindrical shell 20 which houses an optical system 22, a photocathode 24, first and second pairs of deflection plates 26 and 28, a target plate 30, and an electron multiplier means 32. The optical system 22 includes a wide angle lens which is exposed to the electromagnetic energy derived from Canopus. The photocathode 24 is positioned in the housing 20 at approximately the second focal plane of the optical system 22. The system 22 can be considered as defining a reference plane. The position at which light passed by the system 22 will be imaged on the photocathode 24 will depend on the angle of incidence of the light on the system 22. Thus, parallel rays of electromagnetic energy 34 (FIGURE 5) derived from Canopus at an angle of 75° relative to the ecliptic plane will be focused at a first position 36 on the photocathode 24. One the other hand, parallel rays 38 derived from Canopus when it is positioned at a relative 105° angle are imaged at a second position 40 on the photocathode 24. Of course, parallel rays derived from Canopus at any angle between 75° and 105° will be imaged between the positions 36 and 40. All of the light to which the optical system 22 is responsive will be imaged on an area 25 corresponding to approximately 4° by 30° on the photocathode 24.

The photocathode 24 responds to light falling thereon by providing electron beam portions at each point of light incidence. Thus, the position of the electron beam portion provided by the photocathode 24 in response to light from Canopus is related to the position of Canopus relative to the orientation of the vehicle. Spaced from the photocathode 24 is a target plate 30 which defines an aperture 31 therein. The aperture 31 can comprise a rectangle having dimensions which correspond to a fraction of a degree in height, as illustrated in FIGURE 3, to approximately 5° in breadth. Positioned between the photocathode 24 and target plate 30 is a first pair of deflection plates 26. A deflection voltage is applied across the plates 26 by a voltage source 42. The magnitude of the deflection voltage is controlled by a computer 44 which is responsive to the orbital position of the space vehicle 12. Thus, for any particular voltage applied across the plates 26, only electrons delivered from a relatively small portion of the photocathode corresponding to the small sector under examination at any particular time, will be deflected through the aperture 31 in the target plate 30. Electrons delivered from other portions of the photocathode will merely collide with the target plate. An electron multiplier means 32 is positioned within the housing 20 adjacent the aperture 31 and is responsive to electrons passing through the aperture 31 to provide an amplified signal to a magnitude sensing means 48.

The number of electrons delivered from the photocathode 24 will of course be proportional to the intensity of the electromagnetic energy or light incident thereon. Inasmuch as the intensity of the star Canopus is known, the signal level provided by the electron multiplier 32 is indicative of whether in fact the star Canopus has been acquired in the 5° sector effectively defined by the output of the voltage source 42. If the level of the output signal provided by the electron multiplier 32 is within predetermined limits, then the magnitude sensing means 48 activates the attitude control means 50 to permit the roll attitude of the vehicle to be controlled by the star sensor signals. If the magnitude sensing means 48 indicates that no star within the defined sector can be Canopus, then the attitude control means will remain disabled. Thus, it should be appreciated that the deflection plates 26 in combination with the deflection voltage source 42 permit the sensor 18 to monitor the appropriate and relatively narrow 5° sector, of a possible 30° field of view, at all times dependent upon the position of the space vehicle in its orbital path. It should be appreciated that the sensor 18 thus effectively electronically simulates the effect of a gimballed mirror without requiring the utilization of any moving mechanical parts which, as noted, are relatively unreliable.

When the star Canopus is being tracked, that is, when electromagnetic energy provided thereby results in the provision of an electron beam having a portion which is directed through the aperture 31, a determination can be made of the roll attitude of the space vehicle. Consider the effect of roll on the sensor 18 of FIGURES 3 and 4. Note in FIGURE 4 that a change in roll attitude will have the effect of rotating the sensor 18 about the axis 16 extending perpendicular to the paper. This rotation will in turn have the effect of moving the beam portion resulting from the light provided by Canopus either up or down on the photocathode 24 depending upon the direction of roll. Thus, the degree of roll can be determined by determining the magnitude of deflection voltage which has to be applied to the deflection plates 28 to deflect the beam provided by the photocathode through the aperture 31. More particularly, if the light from Canopus is along the optic axis of the system 22, then the resulting electron beam provided by the photocathode 4 will pass through the aperture 31 without the application of any voltage to the deflection plates 28. In this situation, the roll angle is zero. When, however, a positive or negative roll angle is present, the electron beam delivered from the photocathode 24 as a result of the Canopus light, must be deflected in order to pass through the aperture 31. The magnitude of the voltage necessary to sufficiently deflect the beam is thus representative of the roll angle.

A relatively simple and inexpensive technique for determining the roll angle, is to continually apply a scanning voltage from source 60, which voltage can be in the form of a sine wave, across the plates 28. As a result, the beam will be deflected through the aperture 31 twice each cycle of the scanning voltage. Assuming the scanning voltage to be at a one kilocycle frequency, then the electron multiplier 32 will provide a two kilocycle output signal plus higher harmonics to a preamplifier 62. The output of the preamplifier can be coupled through a one kilocycle filter 64 to the input of a demodulating circuit 66. The output of the source 60 can also be coupled to the demodulator 66. The phase relationship between the output of the filter 64 and the source 60 is of course a measure of the roll angle of the vehicle. That is, if the signal pulses provided by the filter 64 coincide with zero crossover points of the signal provided by the source 60, then it is clear that the light emanating from Canopus is on the optic axis of the system 22. The phase difference between the output voltage provided by the filter 64 and the scanning voltage provided by the source 60 will increase as the roll angle of the vehicle increases. The output of the demodulator 66 is coupled to the attitude control means 50 in order to correct the attitude of the vehicle when a roll angle is recognized.

From the foregoing, it should be appreciated that a star sensor for use on a space vehicle has been provided herein which permits the sensor to examine at any one time only a portion of its total field of view without requiring the utilization of moving mechanical parts. In addition, the invention provides electronic means for sensing the roll angle of the vehicle by determining how much deflection voltage is required to move the electron beam provided by the photocathode to a position corresponding to the position which would occur without the application of deflection voltages when the roll angle is zero.

The preferred embodiment of the invention thus far described contemplates utilization of a rectangular aperture 31 and a target plate 30 as illustrated in FIGURE 3. As an alternative, the target plate 30 can be provided with a trapezoidal aperture 33 as shown in FIGURE 6. The spacing between the parallel sides of the trapezoidal aperture 33 can be identical to the spacing between the corresponding sides of the rectangular aperture 31. The two other sides of the trapezoidal aperture can flare out as is illustrated so that the pulse width of a signal provided by the electron multiplier 32 as a consequence of the electron beam being deflected through the aperture 33, will precisely indicate the position of the star Canopus within the 5° sector being examined.

Further embodiments of the invention can advantageously utilize apertures which are different from either of the aforementioned shapes. Thus, the embodiment of FIGURE 7 employs a circular aperture 35 which is useful for tracking on the center of a star or planet. It is desirable to track in this manner when, for example, it is desired to land a space vehicle on the planet. By applying a scanning voltage to both sets of beam deflection plates, the direction of travel of the planet can be measured with reference to the vehicle coordinate system. The measured value of planet angular motion is then utilized to compute the proper maneuver to bring the vehicle into its desired trajectory.

Although only the sensing of electromagnetic energy in the visible and near visible wavelength regions have been specifically considered herein, it should be appreciated that energy in other regions of the spectrum could be sensed by employing an energy focusing system other than the optical system 22. It is merely necessary that the focusing system define a reference plane having an axis and that it be able to pass energy resulting in a cathode providing an electron beam whose position is related to the angle between the reference axis.

What is claimed is:

1. In combination with a vehicle, a sensor mounted thereon for determining the attitude of said vehicle relative to a source of electromagnetic energy, said sensor including means defining a reference plane having a reference axis; cathode means for providing an electron beam at a position related to the magnitude of the angle between said reference axis and a line from said source to the intersection of said reference plane and said reference axis; a target; means for variably deflecting said beam to cause said beam to find said target; and means responsive to said beam finding said target and to the deflection necessary therefor for indicating the attitude of said vehicle.

2. In combination with a vehicle, a sensor mounted thereon for determining the attitude of said vehicle relative to a source of electromagnetic energy, said sensor including optical means exposed to said electromagnetic energy; photoemissive cathode means spaced from said optical means so as to be responsive to said electromagnetic energy for providing an electron beam at a position related to the attitude of said vehicle relative to said source; an electron beam target; means for variably deflecting said beam to cause said beam to find said target; and means responsive to said beam finding said target and to the deflection necessary therefor for indicating the attitude of said vehicle.

3. In combination with a vehicle, a sensor mounted thereon for determining the attitude of said vehicle relative to a source of electromagnetic energy, said sensor including optical means exposed to said electromagnetic energy; photoemissive cathode means spaced from said optical means so as to be responsive to said electromagnetic energy for providing an electron beam at a position related to the attitude of said vehicle relative to said source; a plate defining an aperture therein; beam deflection means; means applying a signal to said deflection means for directing said beam through said aperture; and means responsive to said signal applied to said deflection means when said beam is directed through said aperture for indicating the attitude of said vehicle.

4. In combination with a vehicle, a sensor mounted thereon for determining the attitude of said vehicle relative to a source of electromagnetic energy, said sensor including optical means exposed to said electromagnetic energy; photoemissive cathode means spaced from said optical means so as to be responsive to said electromagnetic energy for providing an electron beam at a position related to the attitude of said vehicle relative to said source; beam deflection means; a plate defining an aperture therein; means applying an alternating signal to said deflection means for causing said beam to scan across said plate; means for sensing when said beam passes through said aperture; and means responsive to the value of said alternating signal when said beam passes through said aperture for indicating the attitude of said vehicle.

5. In combination with a vehicle, a sensor mounted thereon for determining the attitude of said vehicle relative to a source of electromagnetic energy, said sensor including optical means exposed to said electromagnetic energy; photoemissive cathode means spaced from said optical means so as to be responsive to said electromagnetic energy for providing an electron beam at a position related to the attitude of said vehicle relative to said source; a plate defining an aperture therein; first deflection means for deflecting said beam in a first direction; second deflection means for deflecting said beam in a second direction; means applying an alternating signal to said first deflection means for causing said beam to scan across said plate in said first direction; means for applying a selected signal to said second deflection means; means for sensing when said beam passes through said aperture; and means responsive to the value of said alternating signal when said beam passes through said aperture for indicating the attitude of said vehicle.

6. The combination of claim 5 wherein said aperture is rectangular.

7. The combination of claim 5 wherein said aperture is trapezoidal and defines parallel sides spaced from each other in said second direction.

8. The combination of claim 5 wherein said aperture is circular.

9. In combination with a vehicle adapted to orbit in approximately the ecliptic plane and having means thereon for directing a first axis thereof toward the sun, a star sensor fixedly carried by said vehicle sensitive to stars within an $m°$ field of view within a range of $\pm n°$ from a line through said sun and normal to said ecliptic plane, said star sensor comprising an electromagnetic energy focusing system having a $2n°$ field of view for passing electromagnetic energy provided by stars within said field of view; means fixedly positioning said focusing system in said star sensor to coincide said focusing system field of view with said range of $\pm n°$ from said line through the sun and normal to said ecliptic plane; cathode means positioned proximate to said focusing system and responsive to electromagnetic energy passed thereby for providing an electron beam having a position related to the position of the source of said passed electromagnetic energy; an electron beam target having dimensions corresponding to said $m°$ field of view; means on said vehicle for indicating the orbital position of said vehicle; and means responsive to said vehicle orbital position for deflecting said electron beam.

10. In combination with a vehicle adapted to orbit in the ecliptic plane and having means thereon for directing a first axis thereof toward the sun, a star sensor fixedly carried by said vehicle sensitive to stars within an $m°$ field of view within a range of $\pm n°$ from a line through said sun and normal to said ecliptic plane, said star sensor comprising an optical system having a $2n°$ field of view for passing light provided by stars within said field of view; means fixedly positioning said optical system in said star sensor to coincide said optical system field of view with said range of $\pm n°$ from said line through the sun and normal to said ecliptic plane; photocathode means positioned proximate to said focusing system and responsive to electromagnetic energy passed thereby for providing an electron beam having a position related to the position of the source of said passed electromagnetic energy; an electron beam target having dimensions corresponding to said $m°$ field of view; means on said vehicle for indicating the orbital position of said vehicle; means responsive to said vehicle orbital position for deflecting said electron beam; and circuit means responsive to said electron beam finding said target.

11. In combination with a vehicle adapted to orbit in the ecliptic plane and having means thereon for directing a first axis thereof toward the sun, a star sensor fixedly carried by said vehicle sensitive to stars within an $m°$ field of view within a range of $\pm n°$ from a line through said sun and normal to said ecliptic plane, said star sensor comprising an optical system having a $2n°$ field of view for passing light provided by stars within said field of view; means fixedly positioning said optical system in said star sensor to coincide said optical system field of view with said range of $\pm n°$ from said line through the sun and normal to said ecliptic plane; photocathode means positioned proximate to said focusing system and responsive to electromagnetic energy passed thereby for providing an electron beam having a position related to the position of the source of said passed electromagnetic energy; a plate having an aperture therein adapted to said electron beam, said aperture having a dimension corresponding to said $m°$ field of view; means on said vehicle for indicating the orbital position of said vehicle; means for developing a signal for deflecting said electron beam in a first direction to a position relative to said aperture which position is dependent upon said indicated orbital position; and circuit means responsive to said electron beam passing through said aperture.

12. The combination of claim 11 including means for indicating the roll attitude of said vehicle about said first axis, said means including second deflection means for deflecting said beam in a second direction; means applying an alternating signal to said second deflection means for causing said beam to scan across said plate; and means responsive to said circuit means for indicating the value of said alternating signal when said beam passes through said aperture and thereby the roll attitude of said vehicle.

13. The combination of claim 12 wherein said aperture is rectangular and has a dimension corresponding to $m°$ in said first direction.

14. The combination of claim 12 wherein said aperture is trapezoidal defining parallel sides spaced by a distance in said first direction corresponding to said $m°$ field of view.

15. The combination of claim 12 wherein said aperture is circular having a diameter corresponding to said $m°$ field of view.

16. The combination of claim 12 including vehicle attitude control means; said vehicle attitude control means responsive to said value of said alternating signal when said beam passes through said aperture for controlling the attitude of said vehicle.

References Cited by the Examiner

UNITED STATES PATENTS

| 2,659,829 | 11/1953 | Elliott | 244—14 |
| 3,021,428 | 2/1962 | Mattke et al. | 244—14 |
| 3,025,024 | 3/1962 | Barghausen | 244—14 |
| 3,053,984 | 9/1962 | Hulett | 244—14 |

References Cited by the Applicant

UNITED STATES PATENTS

| 2,930,545 | 3/1960 | Houle et al. |
| 2,963,243 | 12/1960 | Rothe. |
| 2,968,454 | 1/1961 | Merrill et al. |
| 2,986,109 | 5/1961 | Kittleman et al. |
| 3,015,457 | 1/1962 | Dixson. |
| 3,025,024 | 3/1962 | Hawes. |
| 3,090,583 | 5/1963 | Behun et al. |

FERGUS S. MIDDLETON, *Primary Examiner.*